United States Patent [19]
Ellis

[11] 4,174,001
[45] Nov. 13, 1979

[54] FAN HOUSING CLEAN OUT APPARATUS

[75] Inventor: Malcolm P. Ellis, Ashland, Me.

[73] Assignee: Lockwood Corporation, Gering, Nebr.

[21] Appl. No.: 800,408

[22] Filed: May 25, 1977

[51] Int. Cl.² ............................................. A01D 33/02
[52] U.S. Cl. ...................................... 171/17; 56/12.8; 56/16.5; 406/97; 406/100
[58] Field of Search .................... 171/17, 124; 56/16.5, 56/12.8; 302/37, 8

[56] References Cited
U.S. PATENT DOCUMENTS

| 2,829,925 | 4/1958 | Monteil | 302/37 |
| 3,227,276 | 1/1966 | Leighton et al. | 171/17 |
| 3,316,025 | 4/1967 | Sullivan et al. | 302/37 |

FOREIGN PATENT DOCUMENTS

| 83974 | 7/1957 | Denmark | 302/37 |
| 2310171 | 9/1974 | Fed. Rep. of Germany | 56/16.5 |
| 2409630 | 10/1974 | Fed. Rep. of Germany | 302/37 |

*Primary Examiner*—Jay N. Eskovitz
*Attorney, Agent, or Firm*—Arnold, White & Durkee

[57] ABSTRACT

A fan housing through which mire is drawn includes a plurality of rods connected around and inside the periphery of the housing and a belting placed thereover, ends of the belting extending through a side opening in the housing and connected to a rocker arm or other oscillating means, thereby flexing the belting and scraping the belting against the rods to prevent mire build up and to remove existing mire without having to shut down fan operation.

13 Claims, 4 Drawing Figures

FAN HOUSING CLEAN OUT APPARATUS

BACKGROUND OF THE INVENTION

1. Field of the Invention

This invention pertains to fan housing cleanout apparatus and more specifically to such apparatus for cleaning a fan housing through which mire or other sticky substances are passed during operation, such as through the fan housing part of a vacuum chamber included in a potato harvester.

2. Description of the Prior Art

Fans generally operate in environmental conditions which permit hours of maintenance free operation before cleanup is required. This is true even for fans used in removing dirt and other air-borne particles from the air or from surfaces, such as fans in air conditioners, vacuum cleaners and the like. Therefore, it is not inherently aggravating or expensive to periodically shut down operations and to clean out such fan housings whenever residue build up requires it.

However, in the case of a fan operating in conjunction with relatively large quantities of extremely sticky substances, the continual stopping of operations to clean out the fan housing is both aggravating and expensive in terms of down time. For example, the latest generation of potato harvester utilizes such a fan. Generally, the harvester digs up the potatoes being harvested and conveys them to a separator, together with rocks, clay-like mud in which they are grown, and grasses and weeds that are inherently associated with the field growing of potatoes. This separator includes a vacuum chamber comprising a system of conveyor belts and a suction fan. The vacuum lifts the lighter potatoes from a main conveyor to a potato conveyor, permitting the heavier foreign particles—mainly rocks—to be unlifted and, hence, unharvested.

It will be apparent that, in addition to lifting potatoes, mud and other mire is drawn through the fan housing of the vacuum chamber. If conditions are wet and the mire is sticky, as is very often the case, then there is a rather rapid build up of this undesirable material in the fan housing that may become so bad as to render ineffective the operation of the fan. This means that the entire harvesting machine must be shut down while the fan housing is cleaned out, usually by scraping the mire from around the housing.

Needless to say, such cleaning is both inconvenient and time consuming.

It is therefore a feature of this invention to provide an improvement in a fan housing cleanout apparatus that achieves cleanout without suspension of fan operation.

It is another feature of the present invention to provide an improvement in apparatus for a fan housing that prevents build up of mire while the fan is operating, thereby minimizing start-and-stop fan operation for frequent periodic cleaning.

SUMMARY OF THE INVENTION

A preferred embodiment of the fan housing cleanout device is illustrated in conjunction with a potato harvester. The vacuum chamber includes a fan housing through which the undesirable mire to be removed is drawn. Support rods are positioned around the inside periphery of the housing and parallel to the axis of the fan. Belting is positioned over the rods and inside the housing, both ends thereof extending through a discharge housing opening near the bottom of the housing where the loosened mire falls to be in position for being blown from the housing by normal fan operation.

Rotating or cycling means, such as in the form of a rocker arm, is attached to the two ends of the belting. Hydraulic or other drive means causes the rocker arm to cycle or oscillate and to first move the belting in a first direction with respect to the rods and then in the opposite direction. This back and forth movement flexes the belting, preventing mire build up and loosening that which is present. In addition, the interference of the rod surfaces with the belting also knocks loose any accumulated mud or other mire.

BRIEF DESCRIPTION OF THE DRAWINGS

So that the manner in which the above-recited features advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings.

DESCRIPTION OF ILLUSTRATED EMBODIMENT

Figure 1:
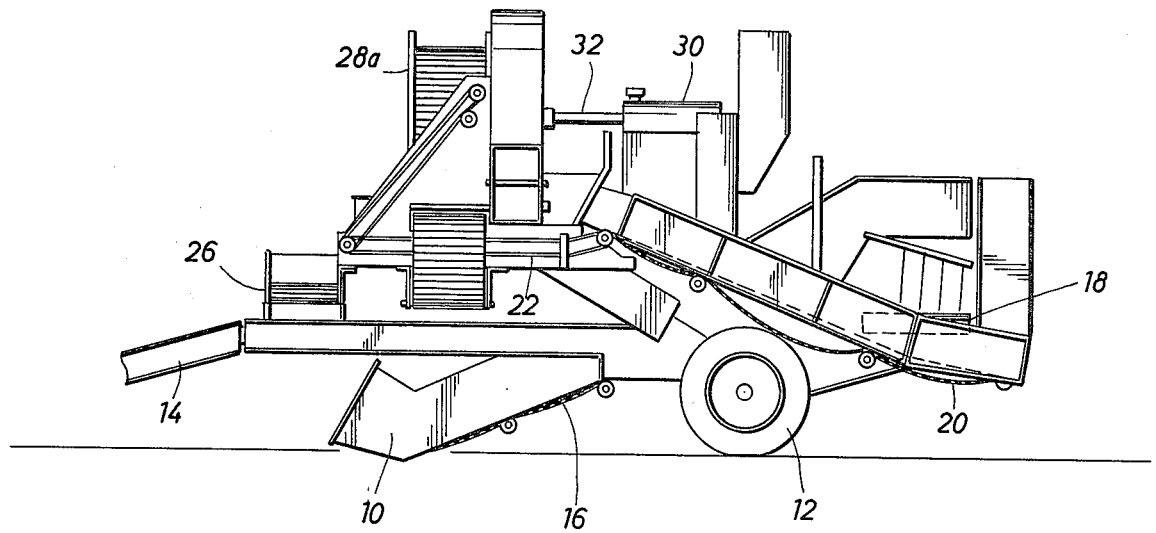
FIG. 1 is a side view of a potato harvester employing a vacuum chamber including a fan housing fitted with a fan housing cleanout device in accordance with the present invention.

Now referring to the drawings, and first to FIG. 1, a potato harvester of modern configuration is shown. In operation of the harvester, nose 10 of the digger section is lowered into the ground to harvest the potatoes in their natural state, the harvester being moved forward along the grounds on wheel 12 as pulled by hitch 14.

A conveyor moves everything which is dug from the earth, including potatoes, rocks and stones, mud and debris, weeds and grasses to a higher level for further conveyor transporting. The returned portion 16 of the digger section conveyor is shown in the lower central portion of the harvester.

The products that are conveyed to a higher level on the digger section conveyor are dumped on a rear cross conveyor 18, shown in hidden section in the drawing.

The conveyors are comprised of cross-links of rubberized chain, which permit at least some of the smaller and non-sticky extraneous materials which were dug from the earth to shake through the conveyor and to be deposited back on the ground behind the harvester.

Figure 2:
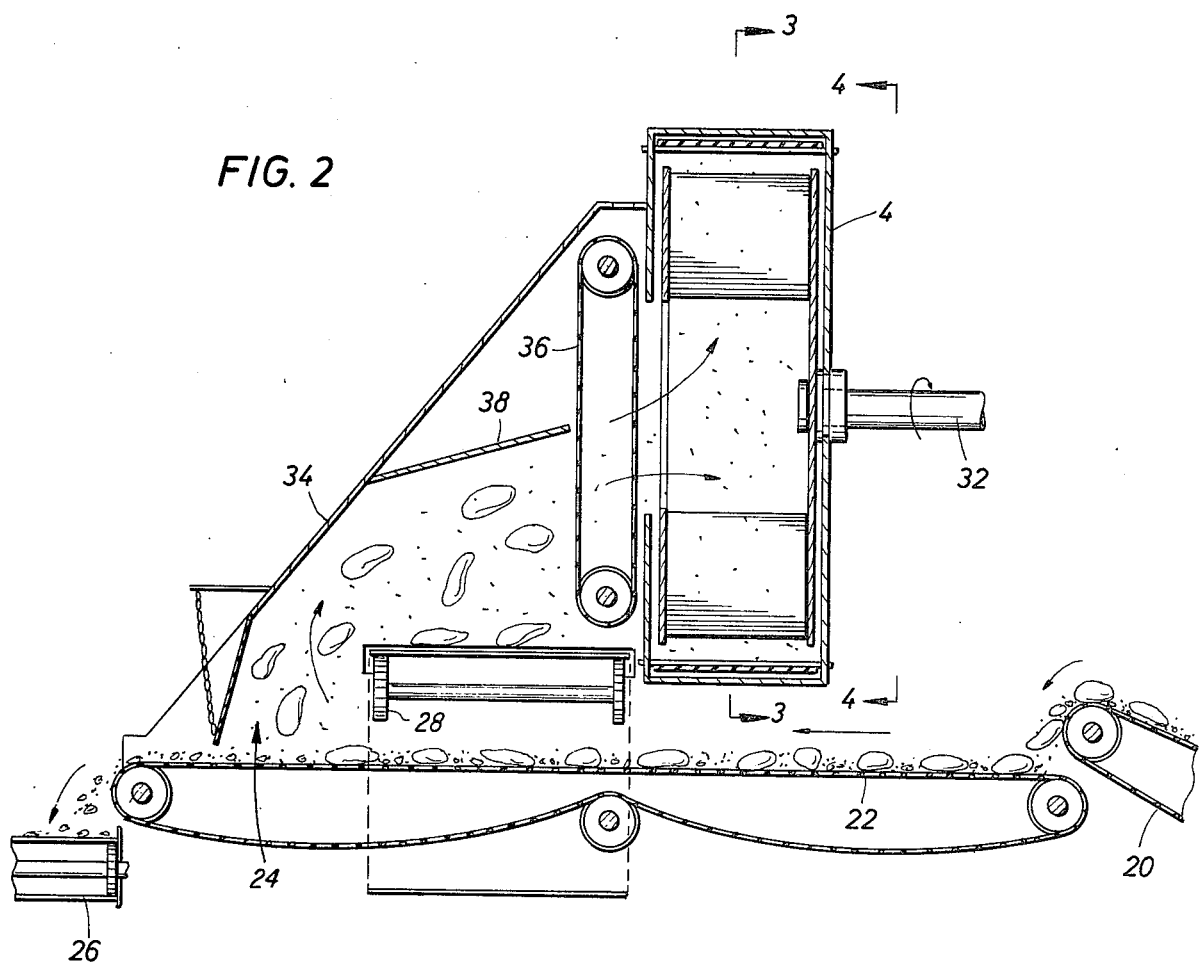
FIG. 2 is a cross sectional view of that portion of the structure shown in FIG. 1 pertaining to the vacuum chamber operation.

The rear cross conveyor deposits the materials which do not drop through the conveyor to the ground onto an elevator conveyor 20, which again provides an opportunity for the miscellaneous unwanted materials to drop through to the ground, while the remainder is conveyed to main conveyor 22, as is best illustrated in FIG. 2.

Main conveyor 22 passes through a vacuum chamber 24, more fully explained below, and dumps the remaining material which are not subject to being lifted by the vacuum chamber action, onto rock conveyor 26. Rock conveyor 26 conveys these remaining materials, which were not removed by vacuum chamber 24, onto the ground.

Vaccum chamber 24 removes the potatoes and other like particles from conveyor 22 and deposits them onto potato conveyor 28. Potato conveyor 28 may include a section 28a which is connected to a hydraulically controlled boom, such as illustrated in the back portion of FIG. 1. Such a structure permits the boom to be swung over an open truck or other vehicle for receiving the harvested potatoes.

In more sophisticated equipment, a separate transverse vacuum chamber conveyor could operate in the immediate vicinity of the vacuum chamber so that the potato conveyor would be a separate conveyor for receiving the potatoes from the transverse vacuum chamber conveyor for loading into trucks or other receiving conveyances.

In conventional manner, the harvester includes a conventional power take-off for driving the various conveyors in the system, as well as an engine 30 for imparting rotational movement to the rotating axis 32 of the fan associated with vacuum chamber 24.

Now referring to the operation of the vacuum chamber, reference should be made to FIG. 2. Vacuum chamber 24 is generally associated over the second half of main conveyor 22 in such a manner that the vacuum hood 34 narrows to a small dimension near the exit for the conveyor. This provides maximum suction for lifting the light particles being conveyed on the main conveyor, namely the potatoes to be separated from the heavier particles.

As is readily apparent, the potatoes are drawn back onto the top of transverse potato conveyor 28. These potatoes are drawn up against a vertical fan blocking conveyor 36, which like the other conveyors, is made up of chain links and therefore permits airflow therethrough. The potatoes cannot pass through the chain link since they are too large; however, it is readily apparent that smaller particles such as mud and other mire, can be drawn through the fan blocking conveyor. If desired a damper 38 may be utilized to prevent the potatoes from rising too far in the vertical direction within hood 34, thereby also preventing excessive bruising of the potatoes.

Fan housing 40 includes a large opening opposite fan blocking conveyor 36, so that the fan action draws air from within hood 34 into the fan housing.

Figure 3:
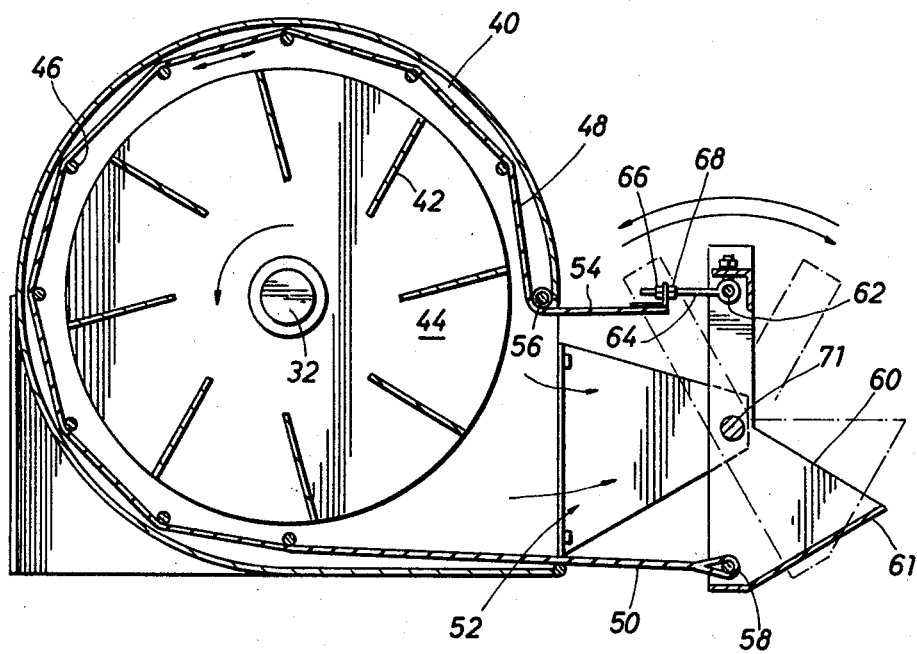
FIG. 3 is a cross sectional view of the fan housing cleanout device for the structure shown in FIG. 2.

Now referring to FIG. 3, it may be seen that the fan located therein, includes blades 42 disposed in conventional fashion with regard to plate 44, the plate being centrally mounted with respect to axis 32.

Plate 44 is circular, and the main portion of housing 40 is likewise circular, there being a short spacing between the outer periphery of plate 44 and the inside of housing 40.

Mounted at a plurality of locations around housing 40 are rods 46. Nine evenly spaced rods are illustrated in FIG. 3; however, it will be understood that a lesser or greater number of rods may be used in any particular installation.

Belting 48, which is approximately the same width as fan housing 40, passes between rods 46 and the inside of housing 40, one end 50 exiting through the lower part of a discharge opening 52 in housing 40. The upper end 54 of belting 48 passes over an idler 56 before exiting at the upper part of opening 52.

Lower end 50 of belting 48 is connected to a lower connecting point 58 on rocker 60 and upper end 54 is connected to an upper connecting point 62 on rocker 60. For convenience, this connection may be made via a J-shaped bolt or shaft 64 connected to the point 62 and secured to upper end 54 of the belting. Shaft 64 is held in place in conventional fashion by nuts 66 and 68 on either side of an eyelet bracket affixed to end 54.

It may be further noted that a pivot plate 70 is secured to housing 40 to provide a fixed pivot point 71 located between connecting points 58 and 62.

Figure 4:
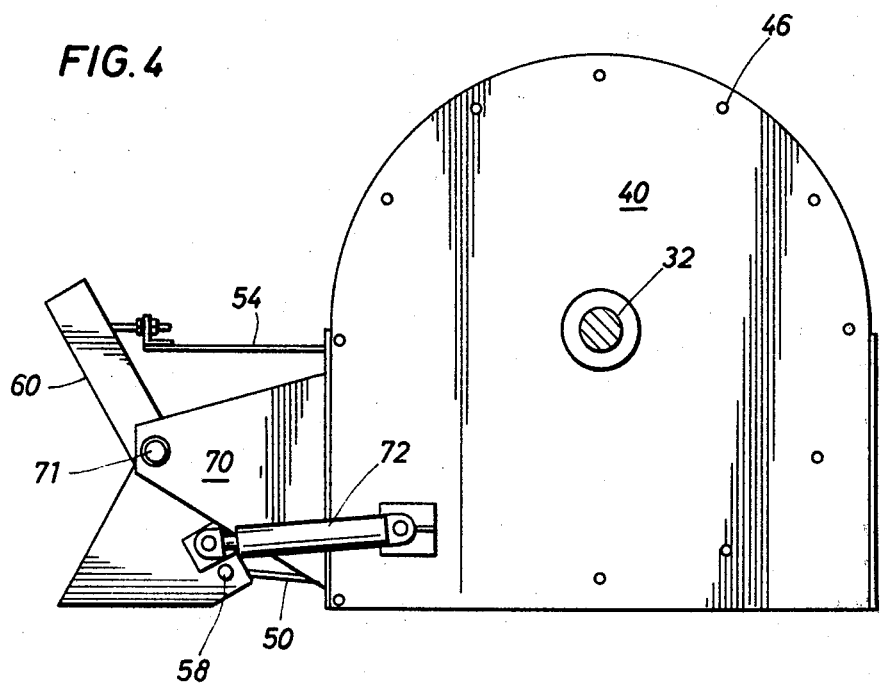
FIG. 4 is a side view of the fan housing cleanout device shown in FIG. 3 illustrating an hydraulic actuator.

Now referring to FIG. 4, an hydraulically driven cylinder 72 is shown connected between housing 40 and the lower part of rocker 60. When activated, this cylinder causes rocker 60 to cycle or move back and forth with respect to housing 40 and therefore cause belting 48 to cycle or oscillate back and forth with respect to rods 46 located within housing 40, as previously described. The travel of the piston of the cylinder 72 is preferably slightly greater than the distance between adjacent ones of the rods 46. This relationship between the displacement of the belting 48 and the spacing between the rods 46 assures optimum cleaning of the belting 48.

In operation of the belting 48, the limited movement back and forth of the belting with respect to the rods causes flexing of the belting and also causes the rods to scrape and remove whatever materials may still cling to the belting. If this is mire or other sticky build up on the belting, then excessive build up is prevented in the housing and continuous operation of the fan is permitted without the fan having to be shut down periodically to permit cleaning of mire.

It may be further noted that rocker 60 includes a deflector 61 which defines an opening therethrough similar to opening 52. Preferably the deflector 61 is designed to direct air flow upwardly. This permits the loosened mud and other materials within the fan housing to be exhausted through opening 52 and the related opening in rocker 60 upwardly with the normal operation of the fan.

The belting material may be canvas, canvas coated with rubber or other convenient material. It should be tensioned, however, so that it does not sag excessively and interfere with fan operation. Adjustment may be made by tightening the connections on elongated shaft 64.

Note also that opening 52 is located near the bottom of the housing so that the material which is to be removed therefrom in accordance with the above description may be done most efficiently, taking full advantage of gravity action on the fallen mire particles.

While a particular embodiment of the invention has been shown, it will be understood that the invention is not limited thereto, since many modifications may be made and will become apparent to those skilled in the arts.

What is claimed is:

1. In combination with a vacuum chamber which includes a fan operating within a fan housing through which mire is drawn, the improvement in a fan housing cleanout apparatus for preventing the build up of mire, comprising
- support rods located around the inside periphery of the housing,
- belting under tension positioned between said rods and the inside housing periphery, and
- oscillating means connected for providing relative movement between said belting and rods thereby to flex said belting and to scrape said belting against said rods to loosen mire attempting to build up on said belting.

2. A cleanout apparatus as described in claim 1, wherein said belting is rubberized.

3. A cleanout apparatus as described in claim 1,
- wherein the fan housing includes an air discharge opening in its periphery,
- wherein said belting includes first and second ends extending through said opening, and
- wherein said oscillating means includes
  - a rocker arm connected to said first and second ends and pivoted therebetween, and
  - hydraulic drive means for rocking said arm.

4. A cleanout apparatus as described in claim 3, wherein said rocker arm includes an opening therein to permit loosened mire to be discharged by fan action through the discharge opening in the fan housing and then through said rocker arm opening.

5. A cleanout apparatus as described in claim 1 wherein said oscillating means translates said belting an amount greater than the distance separating adjacent ones of said support rods.

6. The cleanout apparatus according to claim 1, wherein said oscillating means is operatively connected to move said belting.

7. A vegetable harvester, comprising
- a digger for removing potatoes and accompanying mired earth from the ground,
- a conveyor system for receiving potatoes and mired earth from said digger and for removing loose and disassociated earth therefrom, and
- a vacuum chamber including structure defining a vacuum lifting section through which potatoes and residue mire are lifted from said conveyor system, thereby separating them from heavier particles,
- a fan within a fan housing for drawing air through said lifting section, and
- fan housing cleanout apparatus comprising:
  - support rods located around the inside periphery of the housing,
  - belting under tension positioned between said rods and the inside housing periphery; and
  - rotating means connected to said belting for moving said belting with respect to said rods to flex said belting and to scrape said belting against said rods to loosen mire attempting to build up on said belting.

8. A vegetable harvester as described in claim 7, wherein said belting is rubberized.

9. A vegetable harvester as described in claim 7,
- wherein the fan housing includes a side opening in its periphery,
- wherein said belting includes at least one end extending through said opening, and
- wherein said rotating means includes
  - a rocker arm connected to said first and second ends and pivoted therebetween, and
  - hydraulic drive means for rocking said arm.

10. A vegetable harvester as described in claim 9, wherein said rocker arm includes an opening therein to permit loosened mire to be discharged by fan action through the side opening in the fan housing and then through said rocker arm opening.

11. A vegetable harvester as described in claim 2, wherein said rotating means moves said belting a distance greater than the distance between adjacent ones of said support rods.

12. A fan housing cleanout apparatus for preventing the build up of mire in the fan housing, the fan housing being of the type which has an inner periphery close to which fan blades rotate during operation of the fan, the cleanout apparatus comprising:
  (a) a strip of material movably positioned along said inner periphery of the fan housing; and
  (b) an oscillator for oscillating the strip of material back and forth in a direction generally along said inner periphery, thereby preventing the build up of mire on said flexible strip of material.

13. A self cleaning fan housing for use on a potato harvester comprising:
  (a) a fan housing for a set of rotatable fan blades and of the type including a strip of material adjacent the fan blades, the operation of the fan blades defining a circumferential path, said strip of material being disposed along said circumferential path;
  (b) scraping members fixedly positioned in general engagement with said strip of material; and
  (c) an oscillator for oscillating the strip of material back and forth against the scraping members in a direction generally along said circumferential path, thereby preventing the build up of mire in said fan housing.

* * * * *